United States Patent
Suzuki

(10) Patent No.: US 11,027,771 B2
(45) Date of Patent: Jun. 8, 2021

(54) STEERING ASSISTANCE DEVICE AND STEERING ASSISTANCE METHOD

(71) Applicant: ISUZU MOTORS LIMITED, Tokyo (JP)

(72) Inventor: Teruhiko Suzuki, Ayase (JP)

(73) Assignee: ISUZU MOTORS LIMITED, Tokyo (JP)

(*) Notice: Subject to any disclaimer, the term of this patent is extended or adjusted under 35 U.S.C. 154(b) by 278 days.

(21) Appl. No.: 16/322,872

(22) PCT Filed: Aug. 2, 2017

(86) PCT No.: PCT/JP2017/027981
§ 371 (c)(1),
(2) Date: Feb. 1, 2019

(87) PCT Pub. No.: WO2018/025894
PCT Pub. Date: Feb. 8, 2018

(65) Prior Publication Data
US 2020/0198692 A1    Jun. 25, 2020

(30) Foreign Application Priority Data

Aug. 2, 2016   (JP) .............................. JP2016-152049

(51) Int. Cl.
*B65D 5/04* (2006.01)
*B62D 5/065* (2006.01)
(Continued)

(52) U.S. Cl.
CPC ........... *B62D 5/0463* (2013.01); *B62D 5/065* (2013.01); *B62D 5/07* (2013.01); *B62D 6/007* (2013.01)

(58) Field of Classification Search
CPC ........ B62D 5/0463; B62D 5/065; B62D 5/07; B62D 6/007
(Continued)

(56) References Cited

U.S. PATENT DOCUMENTS

2004/0188169 A1    9/2004   Williams et al.
2007/0235240 A1*  10/2007   Lauer .................. B62D 15/025
                                              180/204
(Continued)

FOREIGN PATENT DOCUMENTS

CN    101746411 A    6/2010
CN    109562781 A    4/2019
(Continued)

OTHER PUBLICATIONS

English Translation of JP 2006-264622 (Mitsubishi Fuso Truck and Bus Corp.) Oct. 5, 2006.*
(Continued)

*Primary Examiner* — Jacob B Meyer
*Assistant Examiner* — Sophia Marie McGuire
(74) *Attorney, Agent, or Firm* — Procopio, Cory, Hargreaves & Savitch LLP

(57) ABSTRACT

A steering assistance device includes: a steering angle detection unit that detects the steering angle of a vehicle; a pump unit that performs steering assistance of the vehicle by using oil pressure; a motor that performs steering assistance of the vehicle by using electrical power; and a steering control unit that causes the pump unit to perform steering assistance with the steering assistance amount thereof reduced by a predetermined amount from the predetermined steering assistance amount, and causes the motor to perform steering assistance, in a case where the pump unit can perform steering assistance in a steering assistance amount predetermined for the detected steering angle.

4 Claims, 8 Drawing Sheets

(51) Int. Cl.
*B62D 5/07* (2006.01)
*B62D 6/00* (2006.01)
*B62D 5/04* (2006.01)

(58) Field of Classification Search
USPC .......................................................... 180/421
See application file for complete search history.

(56) References Cited

U.S. PATENT DOCUMENTS

| | | |
|---|---|---|
| 2010/0147618 A1 | 6/2010 | Osonoi et al. |
| 2014/0311814 A1* | 10/2014 | Morselli .............. A01B 69/008 180/167 |
| 2015/0105980 A1* | 4/2015 | Iwao ...................... B62D 6/00 701/41 |
| 2015/0259006 A1* | 9/2015 | Inoue .................. B62D 15/025 701/41 |
| 2016/0229447 A1* | 8/2016 | Wada ................... B62D 5/0463 |
| 2017/0001662 A1 | 1/2017 | Morselli et al. |
| 2017/0197656 A1* | 7/2017 | Oh ............................ B62D 6/00 |
| 2018/0050724 A1 | 2/2018 | Morselli et al. |
| 2019/0256140 A1 | 8/2019 | Suzuki |
| 2020/0079423 A1* | 3/2020 | Suzuki ................... B62D 1/187 |
| 2020/0180693 A1 | 6/2020 | Suzuki |
| 2020/0385052 A1* | 12/2020 | Sakaguchi ........... B62D 5/0469 |

FOREIGN PATENT DOCUMENTS

| | | |
|---|---|---|
| CN | 109562786 A | 4/2019 |
| DE | 102008051692 A1 | 6/2009 |
| DE | 112012005470 T5 | 9/2014 |
| EP | 2757867 | 7/2014 |
| EP | 3492347 A1 | 6/2019 |
| EP | 3495238 A1 | 6/2019 |
| JP | 2004-090686 A | 3/2004 |
| JP | 2006-213094 A | 8/2006 |
| JP | 2006-264622 A | 10/2006 |
| JP | 2013-010380 A | 1/2013 |
| WO | 2013/034514 A1 | 3/2013 |
| WO | 2018/025889 A1 | 2/2018 |

OTHER PUBLICATIONS

International Search Report and Written Opinion for related International Application No. PCT/JP2017/027981 dated Oct. 24, 3017; 9 pages; English translation of ISR provided.
Extended European Search Report for related European Application No. 17836996.3, dated Jul. 10, 2019; 9 pages.
First Office Action for related CN App No. 201780047825.0 dated Nov. 26, 2020, 17 pgs.

* cited by examiner

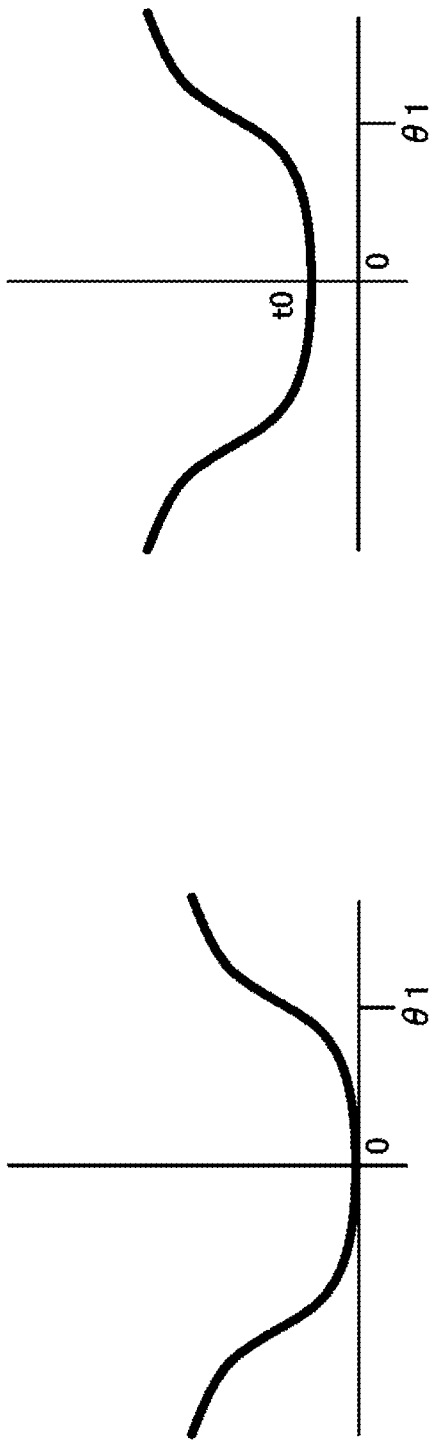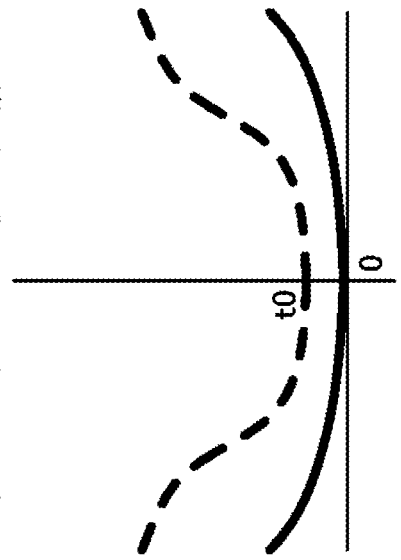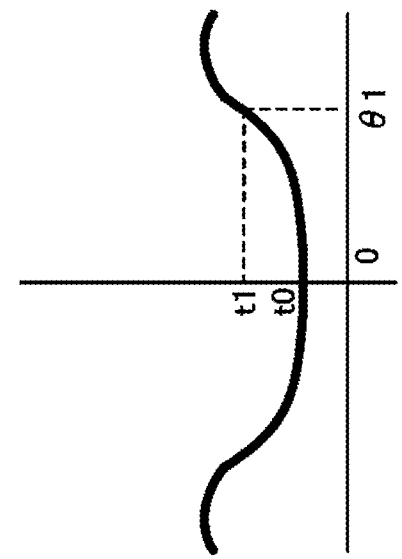

STEERING ASSISTANCE AMOUNT

STEERING RETENTION TORQUE

STEERING ASSISTANCE DEVICE AND STEERING ASSISTANCE METHOD

CROSS-REFERENCE TO RELATED APPLICATIONS

This application is a U.S. National Stage entry of PCT Application No: PCT/JP2017/027981 filed on Aug. 2, 2017, which claims priority to Japanese Patent Application No. 2016-152049, filed Aug. 2, 2016, the contents of which are incorporated herein by reference.

TECHNICAL FIELD

This disclosure relates to a steering assistance device and a steering assistance method.

BACKGROUND ART

Currently, a steering assistance device capable of performing steering assistance of a vehicle by an oil pressure and performing steering assistance of a vehicle by a motor is known. For example, Patent Literature 1 discloses performing steering assistance of the vehicle by an oil pressure in a case where an engine is operating, and performing steering assistance of the vehicle by a motor in a case where the engine is not operating.

CITATION LIST

Patent Literature

Patent Literature 1: JP-A-2004-90686

SUMMARY

Technical Problem

Incidentally, when the vehicle is traveling at a low speed, the steering is stiff, and thus a large amount of steering assistance is required. When the vehicle is traveling at a high speed, steering assistance may be performed so that a position of the vehicle in a travel lane can be finely corrected, or steering guidance may be performed so that the vehicle travels at a center of the lane.

Regarding this, the technique described in Patent Literature 1 merely switches between steering assistance by the oil pressure and steering assistance by the motor based on whether or not the engine is operating, and cannot adjust the steering assistance amount in accordance with the travel state of the vehicle.

The present disclosure has been made in view of these aspects, and provides a steering assistance device and a steering assistance method capable of adjusting a steering assistance amount in accordance with a travel state of a vehicle.

Solution to Problem

A steering assistance device according to a first aspect of the present disclosure includes: a steering angle detection unit, which detects a steering angle of a vehicle; a first assistance unit, which performs steering assistance of the vehicle by using an oil pressure; a second assistance unit, which performs steering assistance of the vehicle by using an electrical power; and a control unit, which causes the first assistance unit to perform steering assistance such that a steering assistance amount of the first assistance unit is reduced by a predetermined amount from the predetermined steering assistance amount and causes the second assistance unit to perform steering assistance, in a case where the first assistance unit can perform steering assistance at a steering assistance amount predetermined for the detected steering angle.

The steering assistance device may further include a speed measurement unit, which measures a traveling speed of the vehicle, wherein the control unit reduces the steering assistance amount of the second assistance unit in accordance with an increase in the measured traveling speed until the traveling speed increases to a predetermined speed.

The control unit may increase the steering assistance amount of the first assistance unit in accordance with the steering angle as compared to the steering assistance amount of the second assistance unit, in a case where the measured traveling speed is larger than the predetermined speed.

The control unit may cause the first assistance unit to perform steering assistance such that the steering assistance amount of the first assistance unit is reduced by a predetermined amount from the predetermined steering assistance amount, and cause the second assistance unit to perform steering guidance at a steering assistance amount equal to or less than the predetermined amount.

A steering assistance method according to a second aspect of the present disclosure includes:
a step of detecting a steering angle of a vehicle; and a step of causing the first assistance unit to perform steering assistance with a steering assistance amount of the first assistance unit reduced by a predetermined amount from the predetermined steering assistance amount, and to cause a second assistance unit configured to perform steering assistance of the vehicle by using an electrical power to perform steering assistance, in a case where a first assistance unit configured to perform steering assistance of the vehicle by using an oil pressure can perform steering assistance at a steering assistance amount predetermined for the detected steering angle.

Advantageous Effects of Invention

According to the present disclosure, it is possible to adjust a steering assistance amount in accordance with a travel state of a vehicle.

BRIEF DESCRIPTION OF DRAWINGS

FIGS. 4A to 4D are diagrams illustrating the relationship between a steering angle and steering control.

DESCRIPTION OF EMBODIMENTS

Overview of Embodiment

Figure 1:
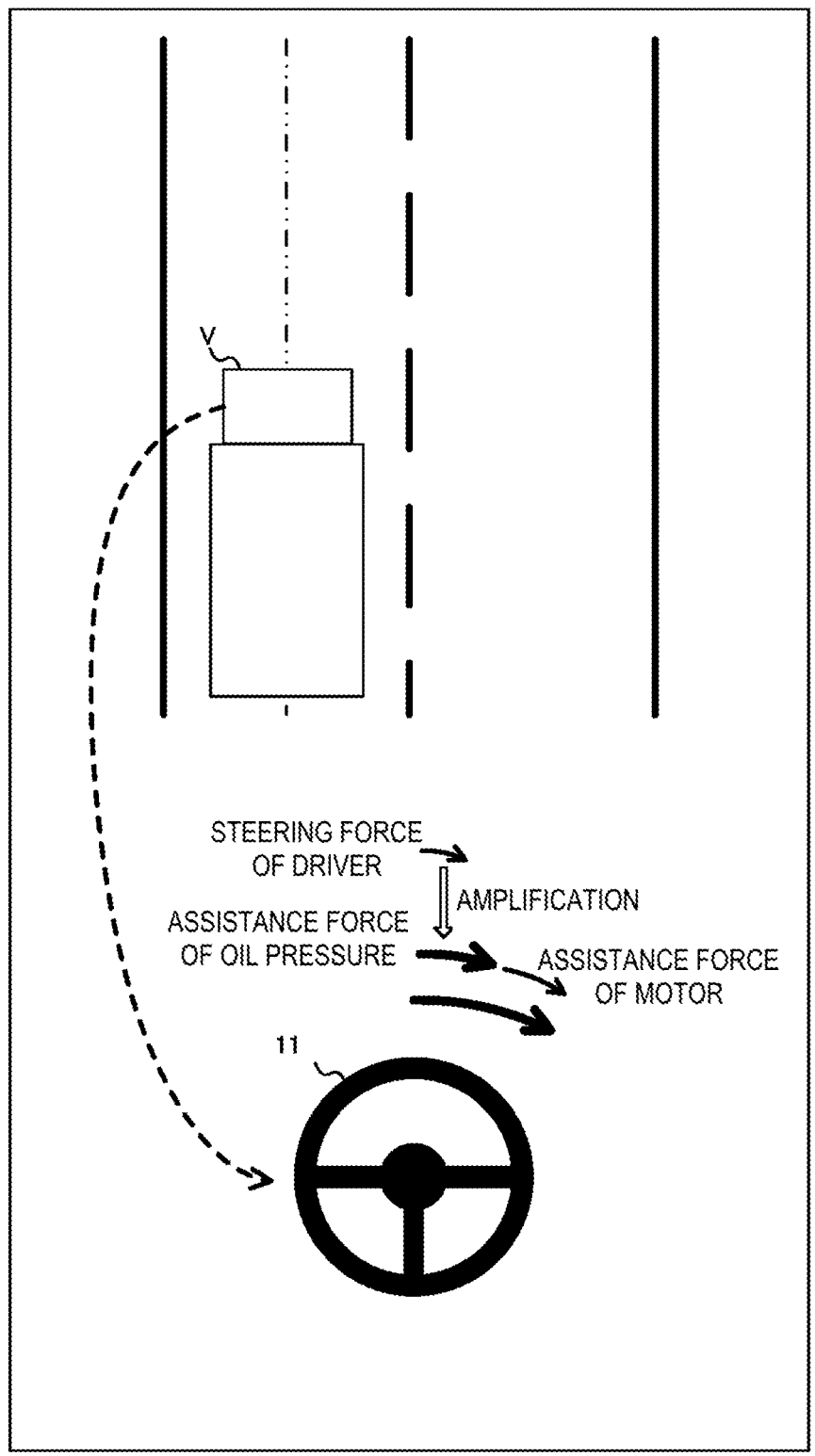
FIG. 1 is a diagram illustrating an overview of a steering assistance device according to an embodiment.

FIG. 1 is a diagram illustrating an overview of a steering assistance device according to an embodiment. The steering assistance device according to the embodiment is mounted on a vehicle V. The steering assistance device according to the embodiment is suitably used for a large vehicle V such as bus and truck, without being limited thereto. In the present description, it is assumed that the vehicle V is a large vehicle V such as bus and truck.

The steering assistance device according to the embodiment realizes steering assistance by generating a steering assistance force obtained by amplifying a steering force, which is generated by a driver of the vehicle V steering a steering 11 provided in the vehicle V, by using an oil pressure. Moreover, the steering assistance device realizes steering assistance by controlling a motor to generate a steering assistance force.

In the steering assistance device according to the embodiment, in a case where steering assistance is performed, steering assistance is performed with a steering assistance amount of the oil pressure reduced, and steering assistance is performed by controlling the motor. In this way, since the steering assistance amount of the motor can be freely adjusted by an amount corresponding to reduction in the steering assistance amount of the oil pressure, it is possible to adjust the steering assistance amount in accordance with the travel state of the vehicle.

<Configuration of Steering Assistance System>

Figure 2:
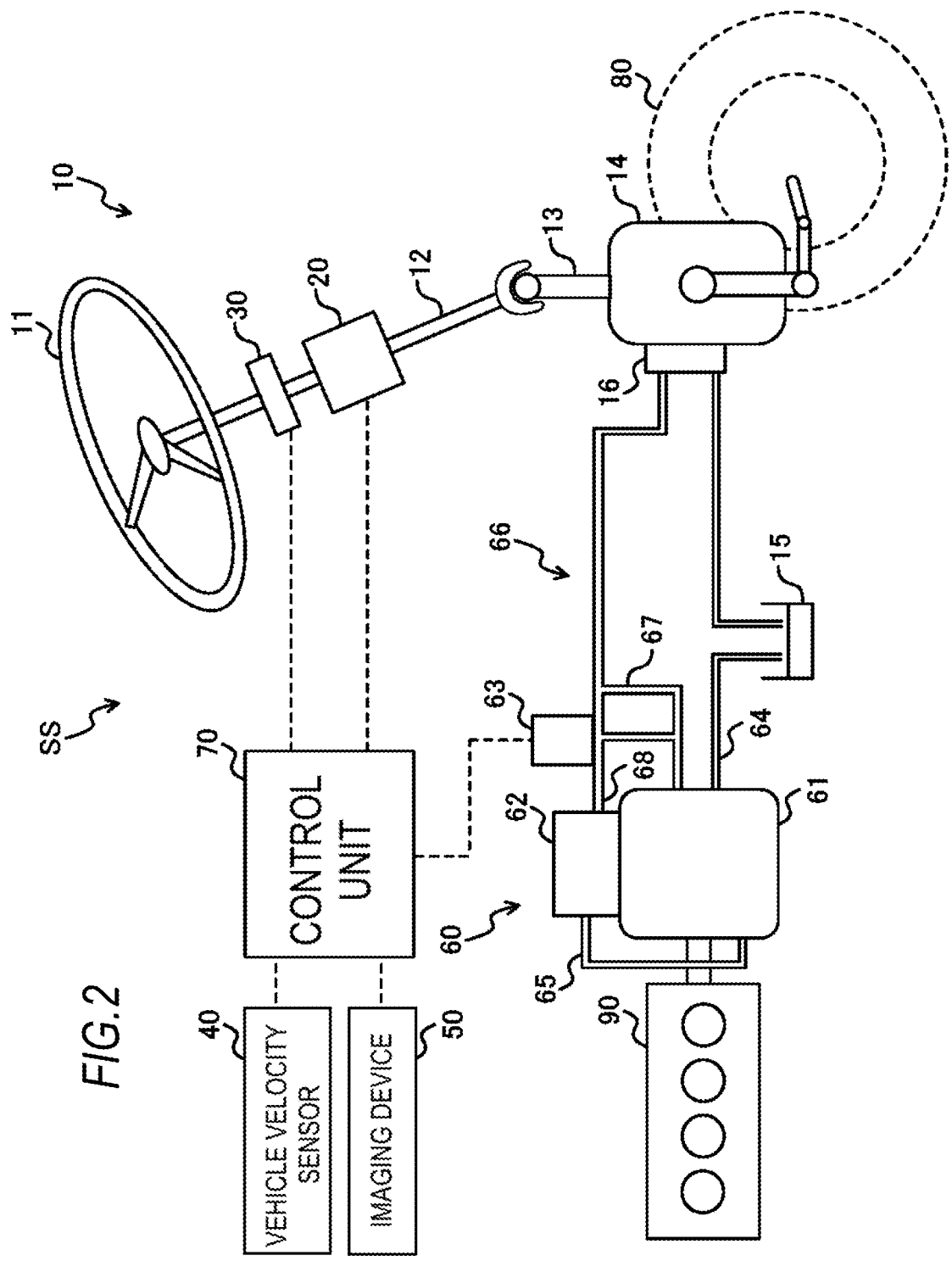
FIG. 2 is a diagram schematically illustrating a configuration of a steering assistance system according to the embodiment.

FIG. 2 is a diagram schematically showing a configuration of a steering assistance system SS according to the embodiment. As shown in FIG. 2, the steering assistance system SS includes an integral steering unit 10, a motor 20, a steering angle sensor 30, a vehicle speed sensor 40, an imaging device 50, a pump unit 60, and a control unit 70.

The integral steering unit 10 is a unit to assist steering operation of the driver. The integral steering unit 10 includes a steering 11, a steering shaft 12, a stub shaft 13, a power cylinder 14, a reservoir tank 15, and a control valve 16.

One end of the steering shaft 12 is connected to the steering 11, and the other end thereof is connected to the stub shaft 13. One end of the stub shaft 13 is connected to the steering shaft 12, and the other end thereof is connected to an input shaft of the power cylinder 14. The steering shaft 12 and the stub shaft 13 transmit a steering torque applied to the steering 11 to the power cylinder 14.

The power cylinder 14 transmits a driving force to a steering wheel 80 of the vehicle V.

The reservoir tank 15 stores a hydraulic oil supplied to the power cylinder 14.

The control valve 16 controls an oil amount of the hydraulic oil supplied to the power cylinder 14, and applies an oil pressure in accordance with the steering torque in the power cylinder 14, so as to assist steering operation of the driver.

The motor 20 is attached to the steering shaft 12. The motor 20 is driven to rotate by electric power supplied from the control unit 70, so as to apply an assistance torque (steering assistance force) to the steering shaft 12 to assist steering operation of the driver. The motor 20 mainly provides a steering guidance function for the vehicle V to travel along a travel lane.

The steering angle sensor 30 is provided on the steering shaft 12, detects a rotation amount of the steering shaft 12, and detects a steering angle $\theta$ based on the rotation amount. The steering angle sensor 30 outputs the detected steering angle $\theta$ to the control unit 70.

The vehicle speed sensor 40 detects the speed of the vehicle V. The vehicle speed sensor 40 outputs the detected speed to the control unit 70.

The imaging device 50 is an in-vehicle camera mounted on the vehicle V. The imaging device 50 captures an image of a front side in a travel direction of the vehicle V including the lane in which the vehicle V travels. The imaging device 50 outputs the captured image to the control unit 70.

The pump unit 60 includes a known variable displacement pump. The pump unit 60 controls a flow rate of a driving oil supplied to the power cylinder 14 due to movement of the steering 11 under control of the control unit 70, thereby providing a power assistance function for transmitting a force in the same direction as the steering force transmitted to the power cylinder 14.

The pump unit 60 includes a pump housing 61, a control valve 62, and an electromagnetic valve 63.

A pump chamber is partitioned in the pump housing 61. The pump chamber is connected to the reservoir tank 15 via a suction passage 64, and sucks the hydraulic oil from the reservoir tank 15 via the suction passage 64. A first connection passage 65 for supplying the hydraulic oil to the control valve 62 is connected to the pump chamber, and a second connection passage 66 for supplying the hydraulic oil to the control valve 16 is connected to the pump chamber.

The second connection passage 66 includes a main oil passage 67 connected to the control valve 16 and an openable and closable sub oil passage 68 connected to the control valve 62.

The control valve 62 controls the flow rate of the hydraulic oil supplied to the power cylinder 14 in cooperation with the electromagnetic valve 63.

The electromagnetic valve 63 controls opening and closing of the sub oil passage 68. The electromagnetic valve 63 is controlled by supplying power from the control unit 70 based on the steering angle detected by the steering angle sensor 30 and the traveling speed of the vehicle V detected by the vehicle speed sensor 40.

The electromagnetic valve 63 closes the sub oil passage 68 when energized. When the secondary oil passage 68 is closed, the control valve 62 reduces a pump discharge amount in the pump unit 60. In contrast, the electromagnetic valve 63 opens the sub oil passage 68 in a non-energized state. When the sub oil passage 68 is opened, the control valve 62 increases the pump discharge amount in the pump unit 60.

For example, since the steering assistance force is required as the steering angle increases, the energization amount to the electromagnetic valve 63 is reduced as the steering angle increases. Further, since the steering assistance force is required as the speed of the vehicle V is lower, the energization amount to the electromagnetic valve 63 is reduced as the traveling speed of the vehicle V is reduced.

The control unit 70 controls the motor 20 and the pump unit 60 to generate a steering assistance force based on the steering angle detected by the steering angle sensor 30 and the vehicle speed detected by the vehicle speed sensor 40. Moreover, the control unit 70 analyzes the image captured by the imaging device 50 to calculate the lateral deviation amount of the vehicle V from a central position in the lane in which the vehicle V travels. For example, in a case where the vehicle V is traveling at equal to or greater than a predetermined speed, the control unit 70 generates a steering assistance force by controlling the motor 20 based on the calculated lateral deviation amount, so as to perform steering guidance so that the vehicle V travels at the center of the lane.

<Functional Configuration of Steering Assistance Device 1>

Figure 3:
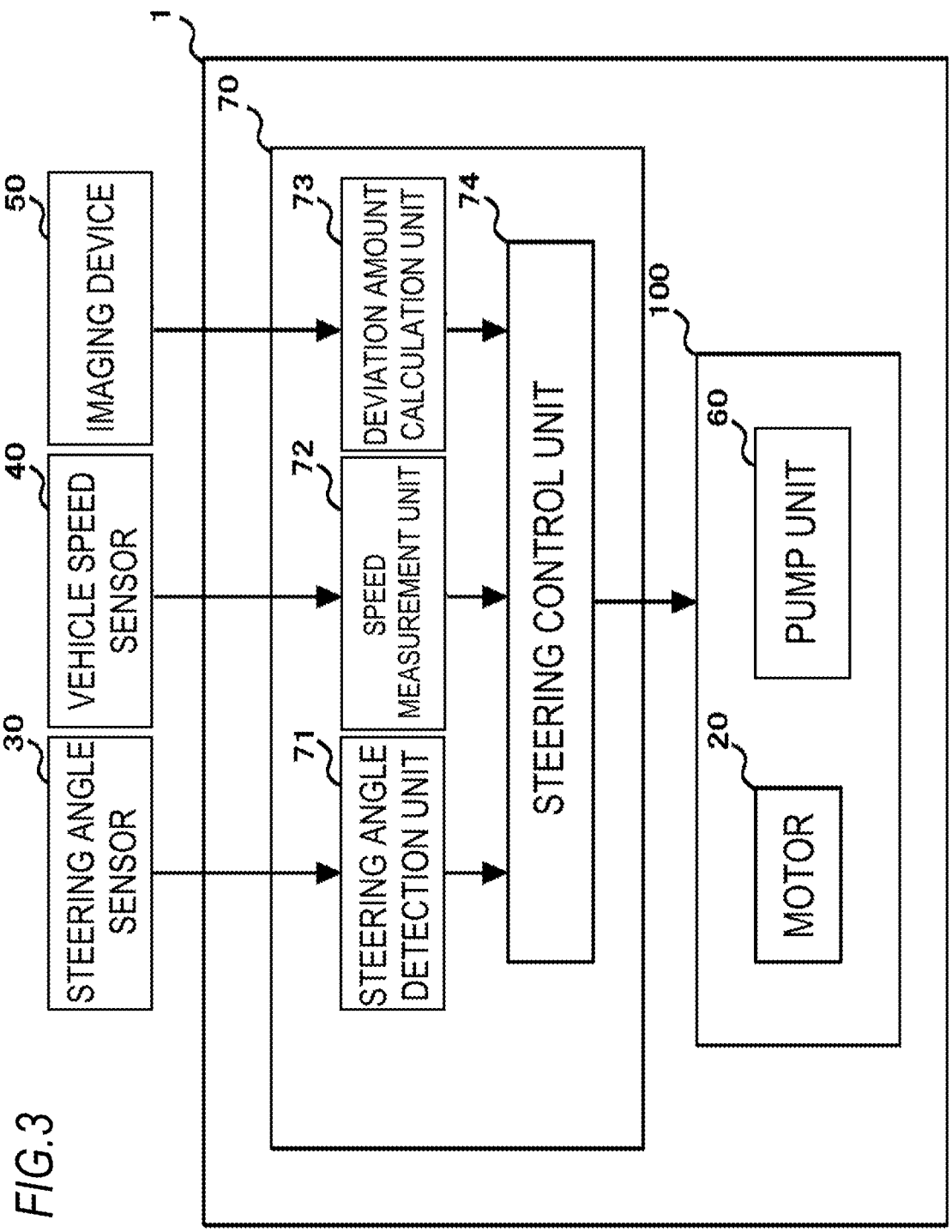
FIG. 3 is a diagram schematically illustrating a configuration of the steering assistance device according to the embodiment.

FIG. 3 is a diagram schematically showing a configuration of the steering assistance device 1 according to the embodiment. The steering assistance device 1 includes a control unit 70 and an assistance unit 100. The control unit 70 is a calculation resource including a processor such as a central processing unit (CPU) and a memory (not shown), and realizes functions of a steering angle detection unit 71, a speed measurement unit 72, a deviation amount calculation unit 73, and a steering control unit 74 by executing programs.

The assistance unit 100 is a mechanism for assisting the driver of the vehicle V to move the steering wheel 80 by operating the steering 11, and includes a motor 20 and a pump unit 60. The pump unit 60 functions as a first assistance unit generating a steering assistance force for performing power assistance in steering of the vehicle V by an oil pressure. The motor 20 functions as a second assistance unit performing steering assistance of the vehicle V by generating an assistance torque by an electric power and applying the torque to the steering shaft 12 as a steering assistance force.

The steering angle detection unit 71 detects the steering angle of the steering 11 by using the steering angle sensor 30. The speed measurement unit 72 measures the traveling speed of the vehicle V by using the vehicle speed sensor 40. The deviation amount calculation unit 73 acquires the image captured by the imaging device 50. The deviation amount calculation unit 73 calculates the lateral deviation amount of the vehicle V from the central position in the lane in which the vehicle V travels by analyzing the acquired image.

The steering control unit 74 performs steering assistance of the vehicle V by controlling the steering assistance force generated by the motor 20 and the pump unit 60 based on the steering angle detected by the steering angle detection unit 71, the traveling speed of the vehicle V measured by the speed measurement unit 72, and the deviation amount calculated by the deviation amount calculation unit 73.

For ease of explanation, first, the relationship between the steering angle and the steering assistance control will be described. In a case where the steering assistance force corresponding to the steering assistance amount predetermined for the steering angle detected by the steering angle detection unit 71 can be output by the pump unit 60, the steering control unit 74 causes the pump unit 60 to perform steering assistance by generating a steering assistance force with the steering assistance amount of the pump unit 60 reduced by a predetermined amount from the predetermined steering assistance amount. The steering control unit 74 causes the motor 20 to perform steering assistance by generating a steering assistance force.

FIGS. 4A to 4D are diagrams illustrating the relationship between the steering angle and the steering control performed by the assistance unit 100. FIGS. 4A, 4B and 4D are diagrams showing the relationship between the steering angle and the torque, in which a lateral axis represents the steering angle of the steering wheel 11 and a vertical axis represents a magnitude of a torque which is a resistance force felt by the driver operating the steering wheel 11. FIG. 4C is a diagram illustrating the relationship between the steering angle and the steering assistance force, in which a lateral axis represents the steering angle of the steering 11 and a vertical axis represents the steering assistance force generated by the control unit 70 on the motor 20. In the example shown in FIG. 4, the traveling speed of the vehicle V is a first speed (for example, around 0 km/h). When the traveling speed of the vehicle V is the first speed, the steering control based on the lateral deviation amount calculated by the deviation amount calculation unit 73 is not performed.

In FIG. 4, in a case where the driver of the vehicle V turns the steering 11 to the right, the steering angle is a positive value, and in a case where the steering 11 is turned to the left, the steering angle is a negative value. For convenience of description, the magnitude of the torque which is a resistance force felt by the driver operating the steering 11 may be referred to as a "steering retention torque".

FIG. 4A is a diagram showing the relationship between the steering angle and the steering retention torque when only the pump unit 60 is caused to output the steering assistance force in the vehicle V mounted with the steering assistance device 1 according to the embodiment. In a case where the steering assistance force is output only to the pump unit 60 as shown in FIG. 4A, that is, in a case where only the power assistance function is realized by the pump unit 60 without the steering assistance force being generated by the motor 20, a characteristic indicating the relationship between the steering angle and the steering retention torque is that the increase rate of the steering retention torque increases as the steering angle increases from near 0 degrees, and then becomes saturated. In a case where the traveling speed of the vehicle V is the first speed, the vehicle V turns in a parking lot or turns to the left or the right at an intersection, so that the steering amount increases. On the other hand, since the characteristic indicating the relationship between the steering angle and the steering retention torque is as shown in FIG. 4A, in a case where the steering 11 is operated at a steering angle equal to or greater than a predetermined angle, the steering becomes heavy suddenly.

Therefore, the steering control unit 74 controls the output of the motor 20 and the pump unit 60 so that the steering does not become heavy even if the driver operates the steering 11 at a steering angle equal to or greater than a predetermined angle. Specifically, the steering control unit 74 first lowers the output of the pump unit 60 as a whole by a predetermined amount t0. As a result, the relationship between the steering angle and the steering retention torque is as shown in FIG. 4B. When the steering 11 is operated in a state where the characteristic of the steering retention torque is in the shape shown in FIG. 4B, the driver of the vehicle V fees that the steering 11 becomes heavy as a whole in accordance with the amount of the torque expressed by the predetermined amount t0.

The steering control unit 74 reduces the steering assistance force of the pump unit 60 by the predetermined amount t0, and simultaneously causes the motor 20 to output a steering assistance force equal to or greater than the predetermined amount t0 as a steering assistance force related to the power assistance function.

FIG. 4C is a diagram illustrating the relationship between the steering assistance force which the motor 20 is caused to output and the steering angle in a case where the traveling speed of the vehicle V mounted with the steering assistance device 1 according to the embodiment is the first speed. As shown in FIG. 4C, the steering control unit 74 generates, for example, a steering assistance force of a steering assistance amount equal to or greater than the predetermined amount t0, on the motor 20. Specifically, the steering control unit 74 causes generates a steering assistance force on the motor 20 such that the steering retention force increases as an absolute value of the steering angle increases.

FIG. 4D is a diagram showing a relationship between the steering angle and the steering retention torque in a case where the vehicle V mounted with the steering assistance device 1 according to the embodiment is traveling at the first speed. The characteristic indicated by solid line in FIG. 4D is a characteristic when the steering assistance force is generated by the motor 20 and the pump unit 60, and the characteristic indicated by broken line is the characteristic shown in FIG. 4B. As shown in FIG. 4D, as a result of the steering assistance force of the motor 20 being transmitted to the steering shaft 12, the driver of the vehicle V can continue the operation without feeling heavy even if the driver operates the steering 11 at a steering angle equal to or greater than a predetermined angle.

Next, the relationship between the speed and steering control will be described. Here, for easiness of description, the description will be made assuming that the lateral deviation amount calculated by the deviation amount calculation unit 73 is 0. The steering control unit 74 reduces the steering assistance amount generated by the motor 20 in accordance with increase in the traveling speed until the traveling speed of the vehicle V measured by the speed measurement unit 72 increases to a predetermined speed (for example, 20 km/h) larger than the first speed. In a case where the traveling speed measured by the speed measurement unit 72 is larger than the predetermined speed, the steering control unit 74 increases the steering assistance amount of the pump unit 60 in accordance with the steering angle as compared to the steering assistance amount of the motor 20.

Figure 5:
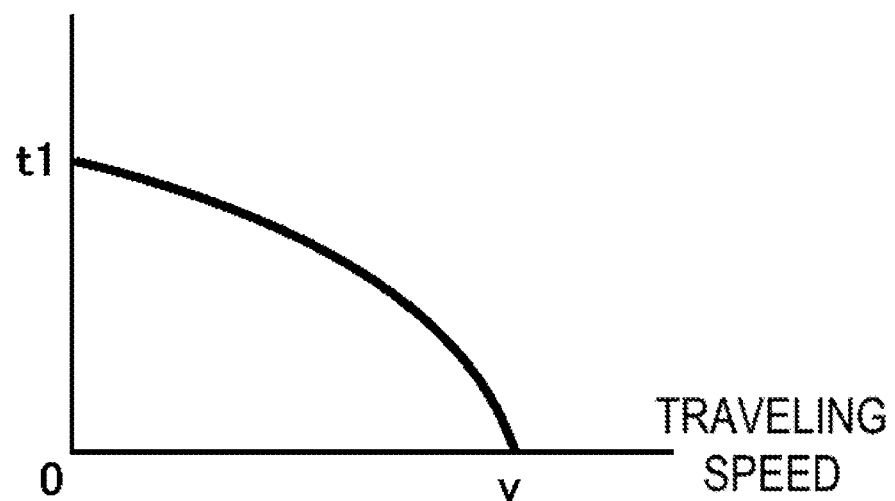
FIG. 5 is a diagram illustrating a relationship between a traveling speed of a vehicle and a steering assistance amount.

FIG. 5 is a diagram illustrating the relationship between the traveling speed of the vehicle V and the steering assistance amount. FIG. 5 shows the relationship between the traveling speed of the vehicle V and the steering assistance amount in a case where the steering angle is the angle θ1, as shown in FIG. 4C. In the example shown in FIG. 5, it is assumed that the lateral deviation amount calculated by the deviation amount calculation unit 73 is 0.

As shown in FIG. 4C and FIG. 5, the steering control unit 74 sets the steering assistance amount of the motor 20 to t1 at the vicinity of 0 km/h, and reduces the assistance torque amount as the traveling speed increases. When the traveling speed of the vehicle V becomes a predetermined speed v, the steering control unit 74 sets the steering assistance amount related to the power assistance function of the motor 20 to 0. Thus, in a case where the traveling speed of the vehicle V is larger than the predetermined speed v, the steering assistance amount related to the power assistance function of the pump unit 60 becomes larger as compared to the steering assistance amount related to the power assistance function of the motor 20.

Figure 6:
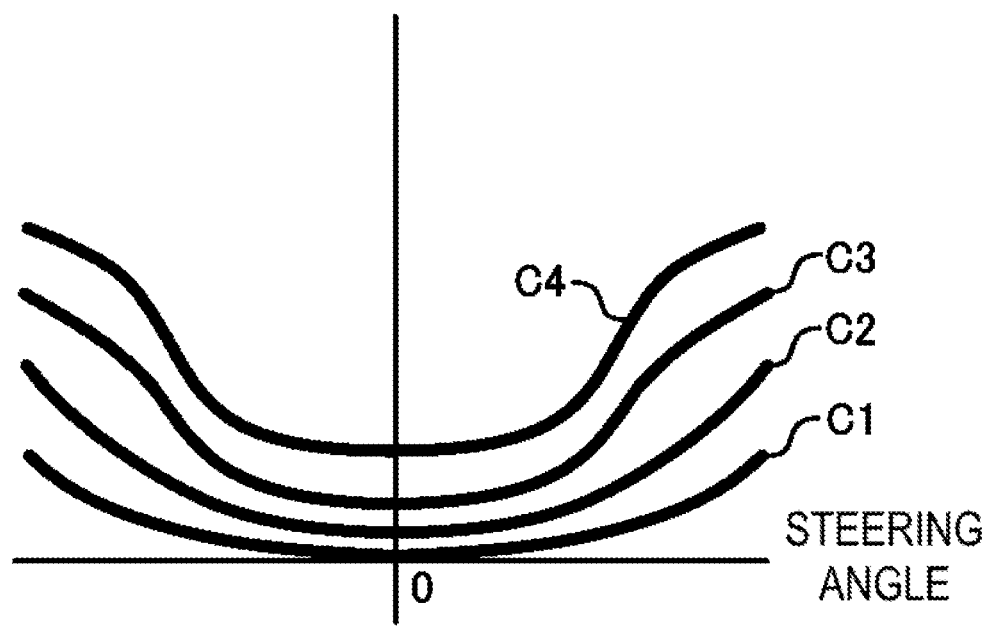
FIG. 6 is a diagram illustrating a relationship between the steering angle and a steering retention torque in each of a plurality of traveling velocities of the vehicle.

FIG. 6 is a diagram illustrating a relationship between the steering angle and a steering retention torque in each of a plurality of traveling velocities of the vehicle V. In the example shown in FIG. 6, it is assumed that the lateral deviation amount calculated by the deviation amount calculation unit 73 is 0.

Characteristics C1 to C4 shown in FIG. 6 show the relationship between the steering angle and the steering retention torque when the traveling speed of the vehicle V is the first speed, a second speed, a third speed, and a fourth speed. Here, the second speed is larger than the first speed, the third speed is larger than the second speed, and the fourth speed is larger than the third speed. Moreover, the third speed is the predetermined speed v. As shown in FIG. 6, it can be confirmed that the steering angle with respect to the steering angle increases as the speed increases. Further, it can be confirmed that as the speed increases, the steering assistance amount of the pump unit 60 becomes larger as compared to the steering assistance amount of the motor 20, and as a result, the characteristic indicating the relationship between the steering angle and the steering retention torque approaches the same shape as that shown in FIG. 4A.

Next, the relationship between the lateral deviation amount of the vehicle V from the lane central position and the steering control will be described.

In a case where the deviation amount calculation unit 73 calculates the lateral deviation amount, the steering control unit 74 causes the motor 20 to perform steering guidance of the vehicle V by generating a steering assistance force in a direction in which the vehicle V returns to the center of the travel lane in accordance with the lateral deviation amount.

Specifically, in a case where a lateral deviation of the vehicle V from the center of the travel lane occurs and steering guidance of the vehicle V is performed by the motor 20, the steering control unit 74 causes the pump unit 60 to perform steering assistance by generating a steering assistance force with the steering assistance amount of the pump unit 60 reduced by a predetermined amount from the predetermined steering assistance amount. The steering control unit 74 performs steering guidance with the motor 20 at a steering assistance force equal to or less than the predetermined amount.

Figure 7:
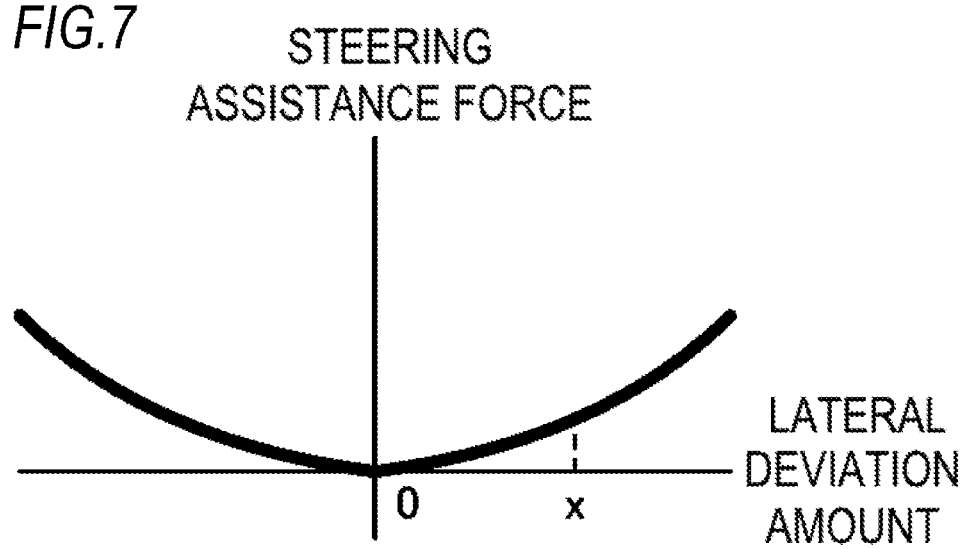
FIG. 7 is a diagram illustrating a relationship between a lateral deviation amount of the vehicle and the steering assistance amount.

FIG. 7 is a diagram illustrating the relationship between the lateral deviation amount and the generation amount of the steering assistance force. In FIG. 7, in a case where the vehicle V is deviated to the right from the lane center, the lateral deviation amount is a positive value, and in a case where the vehicle V is deviated to the left, the lateral deviation amount is a negative value. A torque generated in a case where the lateral deviation amount is positive is a torque guiding the vehicle V in the left direction, and a torque generated in a case where the lateral deviation amount is negative is a torque guiding the vehicle V in the right direction.

In this way, when the vehicle V is traveling at the center of the lane, the steering control unit 74 controls the steering assistance forces generated on the motor 20 and the pump unit 60 so that the steering retention torque of the steering 11 becomes minimum. At this time, the steering control unit 74 determines the generation amount of the steering assistance force generated on the motor 20 in consideration of the steering assistance characteristic of the pump unit 60 at the traveling speed of the vehicle V measured by the speed measurement unit 72. In this way, the steering assistance device 1 can prevent the steering assistance force related to the power assistance performed by the oil pressure and the steering assistance force related to steering guidance from becoming excessively light during steering guidance. Thus, the steering assistance device 1 can stabilize the behavior of the vehicle V during steering guidance.

<Processing Flow of Steering Assistance Executed by Steering Assistance Device 1>

Figure 8:
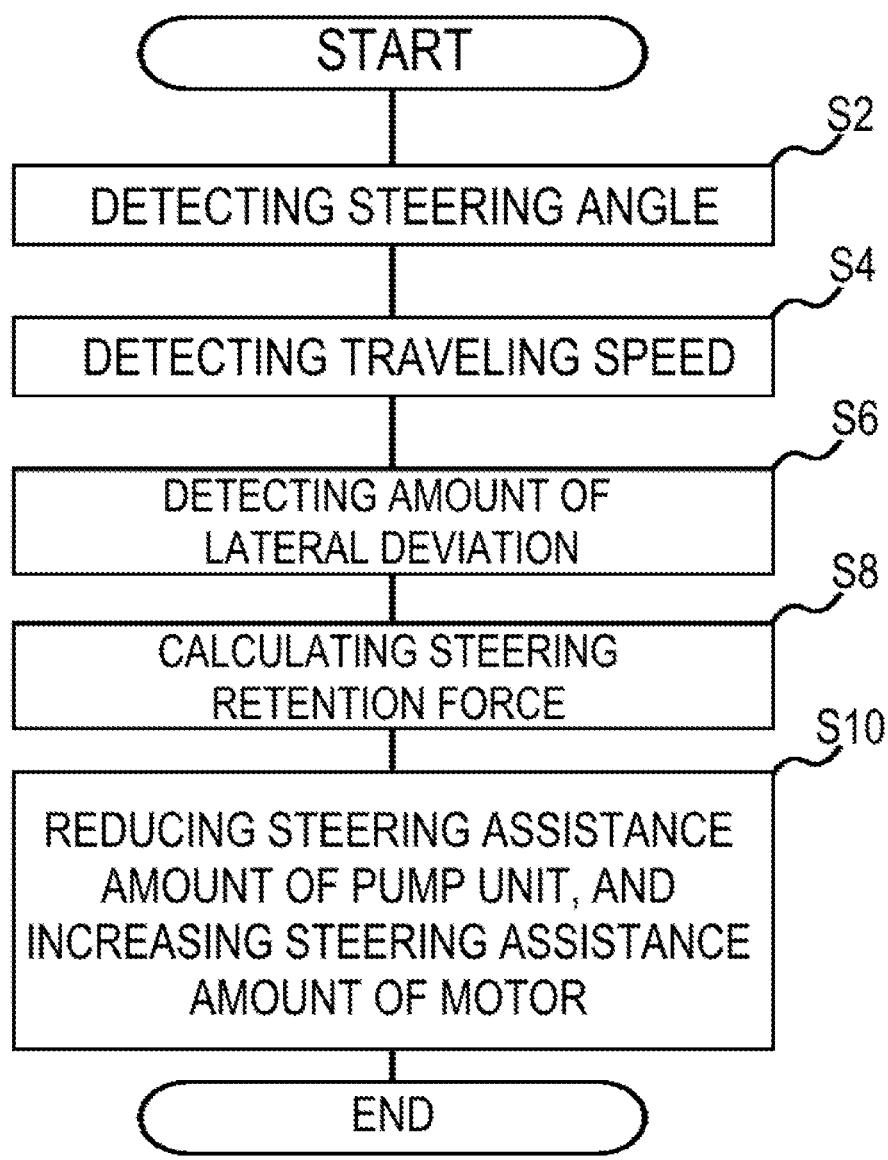
FIG. 8 is a flowchart illustrating a flow of a steering assistance processing executed by the steering assistance device according to the embodiment.

FIG. 8 is a flowchart illustrating the flow of the steering assistance process executed by the steering assistance device 1 according to the embodiment. The processing in this flowchart is started, for example, when an engine 90 of the vehicle V is started.

The steering angle detection unit 71 detects the steering angle by using the steering angle sensor 30 (S2). A speed measurement unit 72 detects the traveling speed of the vehicle V by using the vehicle speed sensor 40 (S4). The deviation amount calculation unit 73 analyzes the image captured by the imaging device 50 to calculate the lateral deviation amount of the vehicle V from the center of the traveling lane of the vehicle V (S6).

The steering control unit 74 calculates a steering retention force required for holding a target steering angle based on the steering angle detected by the steering angle detection unit 71, the traveling speed of the vehicle V measured by the speed measurement unit 72, and the lateral deviation amount of the vehicle V calculated by the deviation amount calculation unit 73 (S8).

The steering control unit 74 reduces the steering assistance force generated on the pump unit 60 by a predetermined amount and increases the steering assistance force generated on the motor 20 during traveling of the vehicle V based on the steering retention force calculated in S8 (S10).

When the steering control unit 74 controls the steering assistance forces generated on the motor 20 and the pump unit 60, the processing in this flowchart is ended. The steering assistance device 1 continues control of the steering assistance force when the vehicle V is traveling by repeating the above processing when the vehicle V is traveling.

As described above, in a case where the pump unit 60 can perform steering assistance of the steering assistance amount predetermined for a detected steering angle, the steering assistance device 1 according to the embodiment causes the pump unit 60 to perform steering assistance such that the steering assistance amount of the pump unit 60 is reduced by the predetermined amount from the predetermined steering assistance amount, and causes the motor 20 to perform steering assistance. In this way, since the steering assistance device 1 can freely adjust the steering assistance amount of the motor 20 by an amount corresponding to reduction in the steering assistance amount of the pump unit 60, it is possible to adjust the steering assistance amount in accordance with the travel state of the vehicle.

In a case where the steering assistance amount of the motor 20 is reduced in accordance with increase in the traveling speed until the measured traveling speed increases to a predetermined speed, and the measured traveling speed is larger than the predetermined speed, the steering control unit 70 increases the steering assistance amount of the pump unit 60 in accordance with the steering angle as compared to the steering assistance amount of the motor 20. In this way, the steering assistance device 1 can appropriately adjust the steering assistance amount in accordance with the speed change of the vehicle V.

In a case where steering guidance of the vehicle V is performed by the motor 20, the control unit 70 causes the pump unit 60 to perform steering assistance such that the steering assistance amount of the pump unit 60 is reduced by the predetermined amount from the predetermined steering assistance amount, and causes the motor 20 to perform steering guidance at a steering assistance amount equal to or less than the predetermined amount.

In a state where steering assistance is performed by the pump unit 60, since the steering 11 becomes light, when the steering assistance is simply performed by the motor 20 in a state where steering assistance is performed by the pump unit 60, the steering becomes too light and the behavior of the vehicle becomes unstable. In contrast, the control unit 70 causes the pump unit 60 to perform steering assistance such that the steering assistance amount of the pump unit 60 is reduced by the predetermined amount, and causes the motor 20 to perform steering guidance at a steering assistance amount equal to or less than the predetermined amount, it is possible to prevent the steering 11 from becoming excessively light. As a result, the steering assistance device 1 can perform steering assistance while stabilizing the behavior of the vehicle V.

While the embodiments of the present disclosure have been described, the technical scope of the present disclosure is not limited to the above described embodiments. It is apparent to persons skilled in the art that various alterations and improvements can be added to the above-described embodiment. It is also apparent from the scope of the claims that the embodiments added with such alterations or improvements can be included in the technical scope of the present disclosure.

For example, in the above-described embodiment, in a case where the traveling speed of the vehicle V is larger than the predetermined speed v, the steering control unit 74 generates a steering assistance force in a direction in which the vehicle V returns to the center of the traveling lane, without being limited thereto. For example, in a case where the traveling speed of the vehicle V is larger than the predetermined speed v, the steering control unit 74 may generate a steering assistance force of the motor 20 when the steering angle is within a predetermined range. FIG. 9 is a diagram illustrating another example of the relationship between the steering angle and the steering assistance force when the traveling speed of the vehicle V is larger than the predetermined speed v.

Figure 9B:
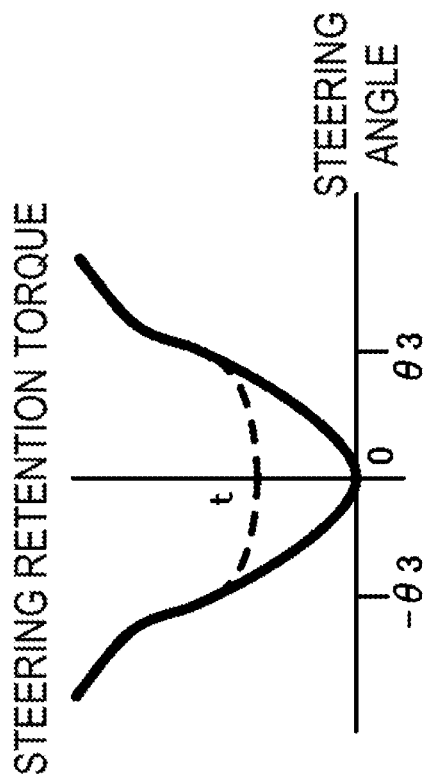
FIGS. 9A and 9B are diagrams showing another example of the relationship between the lateral deviation amount, the steering angle and the assistance torque in a case where the traveling speed of the vehicle is larger than a predetermined speed.
Figure 9A:
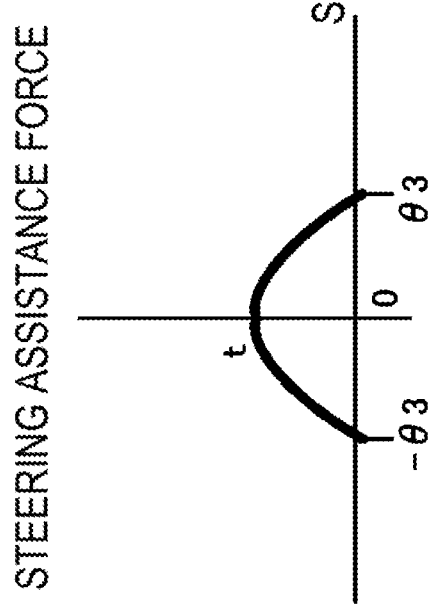

When the steering angle is within a range of angles $-\theta 3$ to $\theta 3$, the steering control unit 74 may generate a steering assistance force with the motor 20 as shown in FIG. 9A, so as to have a V-shaped characteristic indicating the relationship between the steering angle and the steering retention torque. FIG. 9B is a diagram illustrating the relationship between the steering angle and the steering retention torque in a case where the steering control unit 74 reduces the output of the pump unit 60 by a predetermined amount t and causes the motor 20 to output a steering assistance force in accordance with the steering angle of the steering 11. As shown in FIG. 9B, due to the V-shaped characteristic indicating the relationship between the steering angle and the steering retention torque at an angle of $-\theta 3$ to $\theta 3$, the driver can easily adjust the position of the vehicle V in the lane during high-speed traveling.

This application is based on the Japanese Patent Application number 2016-152049 filed on Aug. 2, 2016, the contents of which are incorporated herein by reference.

INDUSTRIAL APPLICABILITY

According to the present disclosure, it is possible to adjust a steering assistance amount in accordance with a travel state of a vehicle.

REFERENCE SIGNS LIST

1 Steering assistance device
10 Integral steering unit
11 Steering
12 Steering shaft 20 Motor
30 Steering angle sensor
40 Vehicle speed sensor
50 Imaging device
60 Pump unit
70 Control unit
71 Steering angle detection unit
72 Speed measurement unit
73 Deviation amount calculation unit
74 Steering control unit
100 Assistance unit
SS Steering assistance system
V vehicle

The invention claimed is:

1. A steering assistance device comprising:
   a steering angle detection unit, which detects a steering angle of a vehicle;
   a first assistance unit, which performs steering assistance of the vehicle by using an oil pressure;
   a second assistance unit, which performs steering assistance of the vehicle by using an electrical power;
   a speed measurement unit, which measures a traveling speed of the vehicle; and
   a control unit, which causes the first assistance unit to perform steering assistance such that a steering assistance amount of the first assistance unit is reduced by a predetermined amount from the predetermined steering assistance amount and causes the second assistance unit to perform steering assistance, in a case where the first assistance unit can perform steering assistance at a steering assistance amount predetermined for the detected steering angle,
   wherein, in a case where the measured traveling speed is larger than the predetermined speed, the control unit increases the steering assistance amount of the first assistance unit in accordance with the steering angle as compared to the steering assistance amount of the second assistance unit.

2. The steering assistance device according to claim 1, further comprising:
   wherein the control unit reduces the steering assistance amount of the second assistance unit in accordance with an increase in the measured traveling speed until the traveling speed increases to a predetermined speed.

3. The steering assistance device according to claim 1,
   wherein, in a case where steering guidance of the vehicle is performed by the second assistance unit, the control unit causes the first assistance unit to perform steering assistance such that the steering assistance amount of the first assistance unit is reduced by a predetermined amount from the predetermined steering assistance amount, and causes the second assistance unit to perform steering guidance at a steering assistance amount equal to or less than the predetermined amount.

4. A steering assistance method comprising:
   detecting a steering angle of a vehicle; and
   measuring a traveling speed of the vehicle;
   causing a first assistance unit to perform steering assistance with a steering assistance amount of the first assistance unit reduced by a predetermined amount from the predetermined steering assistance amount and causing a second assistance unit configured to perform steering assistance of the vehicle by using an electrical power to perform steering assistance, in a case where the first assistance unit configured to perform steering assistance of the vehicle by using an oil pressure can perform steering assistance at a steering assistance amount predetermined for the detected steering angle, wherein, in a case where the measured traveling speed is larger than the predetermined speed, increasing the steering assistance amount of the first assistance unit in accordance with the steering angle as compared to the steering assistance amount of the second assistance unit.

* * * * *